(12) United States Patent
Tateoka et al.

(10) Patent No.: US 12,708,878 B2
(45) Date of Patent: Aug. 18, 2026

(54) METHOD FOR OPERATING SEPARATION MEMBRANE MODULE, COMPUTER-READABLE RECORDING MEDIUM HAVING PROGRAM RECORDED THEREON, AND WATER PRODUCTION SYSTEM

(71) Applicant: Toray Industries, Inc., Tokyo (JP)

(72) Inventors: Daishi Tateoka, Otsu (JP); Kazuki Hagawa, Otsu (JP); Genki Inagaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 728 days.

(21) Appl. No.: 18/018,337

(22) PCT Filed: Jul. 30, 2021

(86) PCT No.: PCT/JP2021/028369

§ 371 (c)(1),
(2) Date: Jan. 27, 2023

(87) PCT Pub. No.: WO2022/025265

PCT Pub. Date: Feb. 3, 2022

(65) Prior Publication Data

US 2023/0285904 A1 Sep. 14, 2023

(30) Foreign Application Priority Data

Jul. 31, 2020 (JP) ................................ 2020-129968

(51) Int. Cl.
*B01D 65/10* (2006.01)
*B01D 63/04* (2006.01)
(Continued)

(52) U.S. Cl.
CPC ........... *B01D 65/109* (2022.08); *B01D 63/04* (2013.01); *B01D 65/02* (2013.01); *C02F 1/008* (2013.01);
(Continued)

(58) Field of Classification Search
CPC ...... B01D 63/04; B01D 65/02; B01D 65/109; B01D 2313/701; B01D 2319/04;
(Continued)

(56) References Cited

U.S. PATENT DOCUMENTS

2002/0179516 A1* 12/2002 Behrendt ............... B01D 63/02 210/500.27
2019/0184343 A1* 6/2019 Hagawa ................. B01D 65/02

FOREIGN PATENT DOCUMENTS

JP 1119485 A 1/1999
JP 11169851 A 6/1999
(Continued)

OTHER PUBLICATIONS

JP2016087516A—EPO Machine Translation (Year: 2025).*
(Continued)

*Primary Examiner* — Patrick Orme
(74) *Attorney, Agent, or Firm* — Buchanan Ingersoll & Rooney PC

(57) ABSTRACT

A method for operating a separation membrane module including identifying a clogged portion of the separation membrane module based on a resistance of a lower portion of the separation membrane module, a filtration resistance of a separation membrane portion, and a resistance of an upper portion of the separation membrane module, in a water production system for obtaining treated water by filtering water-to-be-treated with the separation membrane module.

13 Claims, 5 Drawing Sheets

(51) Int. Cl.
*B01D 65/02* (2006.01)
*C02F 1/00* (2023.01)
*C02F 1/44* (2023.01)

(52) U.S. Cl.
CPC .......... *C02F 1/44* (2013.01); *B01D 2313/701* (2022.08); *B01D 2319/04* (2013.01); *B01D 2321/04* (2013.01); *B01D 2321/162* (2013.01); *B01D 2321/185* (2013.01); *C02F 2209/006* (2013.01); *C02F 2209/03* (2013.01); *C02F 2209/40* (2013.01); *C02F 2209/44* (2013.01); *C02F 2303/16* (2013.01)

(58) Field of Classification Search
CPC .......... B01D 2321/04; B01D 2321/162; B01D 2321/185; C02F 1/008; C02F 1/44; C02F 2209/006; C02F 2209/03; C02F 2209/40; C02F 2209/44; C02F 2303/16
See application file for complete search history.

(56) References Cited

FOREIGN PATENT DOCUMENTS

| | | | | |
|---|---|---|---|---|
| JP | 2007296500 A | | 11/2007 | |
| JP | 2016087516 A | * | 5/2016 | |
| JP | 2018161609 A | | 10/2018 | |
| WO | WO-2018026020 A1 | * | 2/2018 | ............. B01D 65/02 |

OTHER PUBLICATIONS

International Search Report and Written Opinion for International Application No. PCT/JP2021/028369, dated Sep. 21, 2021, 5 pages.

Japanese Explanation of Circumstances Concerning Accelerated Examination for Japanese Application No. 2021-545791, dated Dec. 15, 2021, with English translation, 6 pages.

* cited by examiner

METHOD FOR OPERATING SEPARATION MEMBRANE MODULE, COMPUTER-READABLE RECORDING MEDIUM HAVING PROGRAM RECORDED THEREON, AND WATER PRODUCTION SYSTEM

CROSS REFERENCE TO RELATED APPLICATIONS

This application is the U.S. National Phase application of PCT/JP2021/028369, filed Jul. 30, 2021 which claims priority to Japanese Patent Application No. 2020-129968, filed Jul. 31, 2020, the disclosures of these applications being incorporated herein by reference in their entireties for all purposes.

FIELD OF THE INVENTION

The present invention relates to a separation membrane module and a water production system for treating natural water such as river water, lake water, or seawater, or sewage or industrial wastewater.

BACKGROUND OF THE INVENTION

A membrane separation method has features such as energy saving, space saving, and improvement in filtered water quality, and thus has been widely used in various fields. For example, a microfiltration membrane or an ultrafiltration membrane may be applied to a water purification process for producing industrial water or tap water from river water, groundwater, or treated sewage water, a pretreatment in a seawater desalination reverse osmosis membrane treatment process, or a manufacturing process in a food industrial field.

When water-to-be-treated is subjected to membrane filtration, an amount of contaminants accumulated on a membrane surface, in membrane pores, and in a separation membrane module increases with an amount of treated water, and a decrease in the amount of treated water or an increase in differential pressure becomes a problem.

Accordingly, physical washing has been put into practical use, such as backwashing in which clarified water such as treated water is pushed under pressure in a direction opposite to filtration to remove dirt components accumulated on the membrane surface and in the membrane pores, air washing in which air bubbles are introduced into an water-to-be-treated side (primary side) of a membrane to vibrate the membrane and membranes are brought into contact with each other to scrape off adhered substances on the membrane surface, and simultaneous air washing-backwashing in which air washing and backwashing are simultaneously performed. In addition, after these kinds of washing, polluted water is retained on the primary side of the separation membrane module, and therefore, water in the separation membrane module is generally discharged and then water-to-be-treated is newly supplied.

In order to perform a stable and long-term continuous membrane filtration operation, Patent Literatures 1 and 2 propose a method for controlling a washing time of a backwashing or controlling the frequency of physical washing such as backwashing or air washing in accordance with a measurement value of a membrane differential pressure during filtration.

On the other hand, even when the above-mentioned washing process is performed, only a portion of the separation membrane module which is easily to be washed is washed and there occurs a portion where washing is insufficient, or there occurs a portion where washing is insufficient due to inflow of highly turbid water more than expected due to heavy rain or the like, and stable operation of membrane filtration is difficult in some cases. As a method for solving such a problem, Patent Literature 3 proposes a method for identifying a clogged portion of an accumulated substance in a separation membrane module and efficiently removing the accumulated substance. Specifically, the clogged portion is identified by using a pressure difference between an inlet side and an outlet side on the primary side of the separation membrane module in a process of supplying water-to-be-treated to the primary side of the separation membrane module (water supply process), a pressure difference between the primary side and the secondary side of the separation membrane module in a filtration process of pressure-feeding the water-to-be-treated from the primary side to the secondary side of the separation membrane module, and a pressure difference between the secondary side and the primary side of the separation membrane module in a backwashing process of allowing the water to permeate from the secondary side to the primary side of the separation membrane module, and further performing calculation by combining the respective pressure differences.

PATENT LITERATURE

Patent Literature 1: JPH11-169851A
Patent Literature 2: JPH11-019485A
Patent Literature 3: WO2018/026020

SUMMARY OF THE INVENTION

In identifying the clogged portion of the separation membrane module, it is basically possible to identify the clogged portion by using the method in the related art for identifying the clogged portion of the separation membrane module disclosed in Patent Literature 3. However, the identification is complicated because operation data of at least three processes such as a water supply process, a filtration process, and a backwashing process is required, and further, the identification can be made only by performing the calculation in which the operation data of the respective processes are combined. In addition, in a case where the water supply process is performed after the water discharge process, since a flow rate and a pressure are likely to be unstable immediately after the start of the water supply process, a long time is required to acquire stable data, and the method may not be applied to an operation in which the three processes are not all performed, for example, an operation in which the water supply process or the water discharge process is not performed.

Therefore, an object of the present invention is to provide a method for identifying a clogged portion of a separation membrane module more simply and quickly with higher accuracy than in the related art.

In order to solve the above-mentioned problem, the present invention has the following features.

(1) A method for operating a separation membrane module to identify a clogged portion of the separation membrane module based on a resistance of a lower portion of the separation membrane module, a filtration resistance of a separation membrane portion, and a resistance of an upper portion of the separation membrane module, in a water production system for obtaining treated water by filtering water-to-be-treated with the separation membrane module, in which the separation membrane module includes a cylindrical case in which a separation membrane is inserted, and the separation membrane module has: an water-to-be-treated supply part supplying the water-to-be-treated in a lower portion on a primary side; a treated water discharge part discharging the treated water in an upper portion on a secondary side; and a backwashing waste-water discharge part discharging backwashing waste-water communicating with an outer side of the separation membrane in an upper portion of a side surface of the cylindrical case on the primary side, and the water production system includes a supply pressure sensor measuring a pressure (P1) of the water-to-be-treated supply part, a secondary side pressure sensor measuring a pressure (P2) of the treated water discharge part, and a primary side outlet pressure sensor measuring a pressure (P3) of the backwashing waste-water discharge part, the method including:

calculating a pressure difference (ΔP1) between the P1 and the P3 in a filtration process of filtering the water-to-be-treated from the primary side to the secondary side of the separation membrane module as a first resistance R1, a pressure difference (ΔP2) between the P3 and the P2 in the filtration process as a second resistance R2, and a pressure difference (ΔP3) between the P1 and the P3 in a backwashing process of pressure-feeding from the secondary side to the primary side of the separation membrane module as a third resistance R3, and identifying the clogged portion of the separation membrane module based on amounts of change or rates of change from respective initial values of the first resistance R1, the second resistance R2, and the third resistance R3 that are obtained by the calculation.

(2) The method for operating a separation membrane module according to (1), in which the P3 in the filtration process and the P1 in the backwashing process are static pressures.

(3) The method for operating a separation membrane module according to (1) or (2), in which amounts of change from the respective initial values of the first resistance R1, the second resistance R2, and the third resistance R3 are compared, and when the amount of change from the initial value of the first resistance R1 is larger than the amount of change from the initial value of the second resistance R2 and the amount of change from the initial value of the third resistance R3, or when the amount of change from the initial value of the first resistance R1 is larger than a set value, at least one of the following controls (A) to (C) is performed:

(A) a control a of performing air washing while raising and lowering a liquid surface on the primary side in the separation membrane module;

(B) a control b of lengthening a process time of a water discharge process; and (C) a control c of pressurizing the primary side of the separation membrane module with air and performing pressurized water discharge for discharging water at the time of the water discharge process.

(4) The method for operating a separation membrane module according to (1) or (2), in which rates of change from the respective initial values of the first resistance R1, the second resistance R2, and the third resistance R3 are compared, and when the rate of change from the initial value of the first resistance R1 is larger than the rate of change from the initial value of the second resistance R2 and the rate of change from the initial value of the third resistance R3, or when the rate of change from the initial value of the first resistance R1 is larger than a set value, at least one of the following controls (A) to (C) is performed:

(A) a control a of performing air washing while raising and lowering a liquid surface on the primary side in the separation membrane module;

(B) a control b of lengthening a process time of a water discharge process; and (C) a control c of pressurizing the primary side of the separation membrane module with air and performing pressurized water discharge for discharging water at the time of the water discharge process.

(5) The method for operating a separation membrane module according to (1) or (2), in which amounts of change from the respective initial values of the first resistance R1, the second resistance R2, and the third resistance R3 are compared, and when the amount of change from the initial value of the second resistance R2 is larger than the amount of change from the initial value of the first resistance R1 and the amount of change from the initial value of the third resistance R3, or when the amount of change from the initial value of the second resistance R2 is larger than a set value, at least one of the following controls (F) to (H) is performed:

(F) a control f of performing washing of the separation membrane module by supplying a chemical liquid to the separation membrane module;

(G) a control g of changing at least one of a backwashing time and an air washing time; and (H) a control h of changing at least one of a backwashing flow rate in the backwashing process and an air amount in an air washing process.

(6) The method for operating a separation membrane module according to (1) or (2), in which rates of change from the respective initial values of the first resistance R1, the second resistance R2, and the third resistance R3 are compared, and when the rate of change from the initial value of the second resistance R2 is larger than the rate of change from the initial value of the first resistance R1 and the rate of change from the initial value of the third resistance R3, or when the rate of change from the initial value of the second resistance R2 is larger than a set value, at least one of the following controls (F) to (H) is performed:

(F) a control f of performing washing of the separation membrane module by supplying a chemical liquid to the separation membrane module;

(G) a control g of changing at least one of a backwashing time and an air washing time; and (H) a control h of changing at least one of a backwashing flow rate in the backwashing process and an air amount in an air washing process.

(7) The method for operating a separation membrane module according to (1) or (2), in which amounts of change from the respective initial values of the first resistance R1, the second resistance R2, and the third resistance R3 are compared, and when the amount of change from the initial value of the third resistance R3 is larger than the amount of change from the initial value of the first resistance R1 and the amount of change from the initial value of the second resistance R2, or when the amount of change from the initial value of the third resistance R3 is larger than a set value, at least one of the following controls (D) to (E) is performed:

(D) a control d of supplying water-to-be-treated in a reverse direction from a nozzle for discharging washing wastewater of the separation membrane module; and (E) a control e of performing backwashing, after water on the primary side of the separation membrane module is discharged to make empty state.

(8) The method for operating a separation membrane module according to (1) or (2), in which rates of change from the respective initial values of the first resistance R1, the second resistance R2, and the third resistance R3 are compared, and when the rate of change from the initial value of the third resistance R3 is larger than the rate of change from the initial value of the first resistance R1 and the rate of change from the initial value of the second resistance R2, or when the rate of change from the initial value of the third resistance R3 is larger than a set value, at least one of the following controls (D) to (E) is performed:

(D) a control d of supplying water-to-be-treated in a reverse direction from a nozzle for discharging washing wastewater of the separation membrane module; and (E) a control e of performing backwashing, after water on the primary side of the separation membrane module is discharged to make empty state.

(9) The method for operating a separation membrane module according to any of (3) to (8), in which at least one selected from a primary side pressure fluctuation rate or a water discharge flow rate in the separation membrane module in the water discharge process of discharging water-to-be-treated from a lower portion on the primary side of the separation membrane module to an outside of the system is used as an index, and the clogged portion of the separation membrane module is identified by combining with the first resistance R1, the second resistance R2, and the third resistance R3.

(10) The method for operating a separation membrane module according to (1) or (2), in which a pressure difference (ΔP4) between the P2 and the P1 in the backwashing process is further calculated as a fourth resistance R4, and when a difference (R2−R4) between the second resistance R2 and the fourth resistance R4 is larger than a set value, at least one of the following controls (G) to (I) is performed:

(G) a control of changing at least one of a backwashing time and an air washing time;

(H) a control of changing at least one of a backwashing flow rate in the backwashing process and an air amount in an air washing process; and (I) a control of changing at least one of a water supply process time and a water supply flow rate.

(11) The method for operating a separation membrane module according to (1) or (2), in which a pressure difference (ΔP4) between the P2 and the P1 in the backwashing process is further calculated as a fourth resistance R4, and when a ratio (R2/R4) between the second resistance R2 and the fourth resistance R4 is larger than a set value, at least one of the following controls (G) to (I) is performed:

(G) a control of changing at least one of a backwashing time and an air washing time;

(H) a control of changing at least one of a backwashing flow rate in the backwashing process and an air amount in an air washing process; and (I) a control of changing at least one of a water supply process time and a water supply flow rate.

(12) The method for operating a separation membrane module according to (10) or (11), in which a filtration flux in the filtration process and a backwash flux in the backwashing process are the same.

(13) The method for operating a separation membrane module according to any of (10) to (12), in which the second resistance R2 and the fourth resistance R4 are resistance values calculated based on the pressure difference, flux data, and water temperature data.

(14) A computer-readable recording medium storing a management program for a water production system, for causing a computer to function as a clogged portion identifying unit to identify a clogged portion of a separation membrane module based on a resistance of a lower portion of the separation membrane module, a filtration resistance of a separation membrane portion, and a resistance of an upper portion of the separation membrane module, in order to identify the clogged portion of the separation membrane module in the water production system for obtaining treated water by filtering water-to-be-treated with the separation membrane module, in which the separation membrane module includes a cylindrical case in which a separation membrane is inserted, and the separation membrane module has: an water-to-be-treated supply part supplying the water-to-be-treated in a lower portion on a primary side; a treated water discharge part discharging the treated water in an upper portion on a secondary side; and a backwashing wastewater discharge part discharging backwashing wastewater communicating with an outer side of the separation membrane in an upper portion of a side surface of the cylindrical case on the primary side, and the water production system includes a supply pressure sensor measuring a pressure (P1) of the water-to-be-treated supply part, a secondary side pressure sensor measuring a pressure (P2) of the treated water discharge part, and a primary side outlet pressure sensor measuring a pressure (P3) of the backwashing wastewater discharge part, and the program causing a computer to function as a difference calculation unit and the clogged portion identifying unit, the difference calculation unit calculating a pressure difference (ΔP1) between the P1 and the P3 in a filtration process of filtering the water-to-be-treated from the primary side to the secondary side of the separation membrane module as a first resistance R1, a pressure difference (ΔP2) between the P3 and the P2 in the filtration process as a second resistance R2, and a pressure difference (ΔP3) between the P1 and the P3 in a backwashing process of pressure-feeding from the secondary side to the primary side of the separation membrane module as a third resistance R3, and the clogged portion identifying unit identifying the clogged portion of the separation membrane module based on an amount of change or a rate of change from each initial value of the first resistance R1, the second resistance R2, and the third resistance R3 obtained by the difference calculation unit.

(15) The computer-readable recording medium storing a management program for a water production system according to (14), in which the P3 in the filtration process and the P1 in the backwashing process are static pressures.

(16) A water production system for causing a computer to function as a clogged portion identifying unit to identify a clogged portion of a separation membrane module based on a resistance of a lower portion of the separation membrane module, a filtration resistance of a separation membrane portion, and a resistance of an upper portion of the separation membrane module, in order to identify the clogged portion of the separation membrane module in the water production system for obtaining treated water by filtering water-to-be-treated with the separation membrane module, in which the separation membrane module includes a cylindrical case in which a separation membrane is inserted, and the separation membrane module has: an water-to-be-treated supply part supplying the water-to-be-treated in a lower portion on a primary side; a treated water discharge part discharging the treated water in an upper portion on a secondary side; and a backwashing wastewater discharge part discharging backwashing wastewater communicating with an outer side of the separation membrane in an upper portion of a side surface of the cylindrical case on the primary side, and the water production system includes a supply pressure sensor measuring a pressure (P1) of the water-to-be-treated supply part, a secondary side pressure sensor measuring a pressure (P2) of the treated water discharge part, and a primary side outlet pressure sensor measuring a pressure (P3) of the backwashing wastewater discharge part, the water production system causing the computer to function as a difference calculation unit and the clogged portion identifying unit, the difference calculation unit calculating a pressure difference (ΔP1) between the P1 and the P3 in a filtration process of filtering the water-to-be-treated from the primary side to the secondary side of the separation membrane module as a first resistance R1, a pressure difference (ΔP2) between the P3 and the P2 in the filtration process as a second resistance R2, and a pressure difference (ΔP3) between the P1 and the P3 in a backwashing process of pressure-feeding from the secondary side to the primary side of the separation membrane module as a third resistance R3, and the clogged portion identifying unit identifying the clogged portion of the separation membrane module based on amounts of change or rates of change from respective initial values of the first resistance R1, the second resistance R2, and the third resistance R3 that are obtained by the difference calculation unit.

(17) The water production system according to (16), in which the P3 in the filtration process and the P1 in the backwashing process are static pressures.

According to the present invention, the clogged portion in the separation membrane module can be identified more simply and quickly with higher accuracy than in the related art, and the separation membrane module can be efficiently washed according to the clogged portion, and treated water can be stably obtained over a long period of time.

BRIEF DESCRIPTION OF DRAWINGS

FIG. 1 is a device schematic flow diagram showing an example of a water production system to which the present invention is applied.

FIG. 4 is a schematic view showing an embodiment of the present invention.

FIG. 5A shows a dead-end filtration process, and FIG. 5B shows a backwashing process.

DETAILED DESCRIPTION OF EMBODIMENTS OF THE INVENTION

Figure 2:
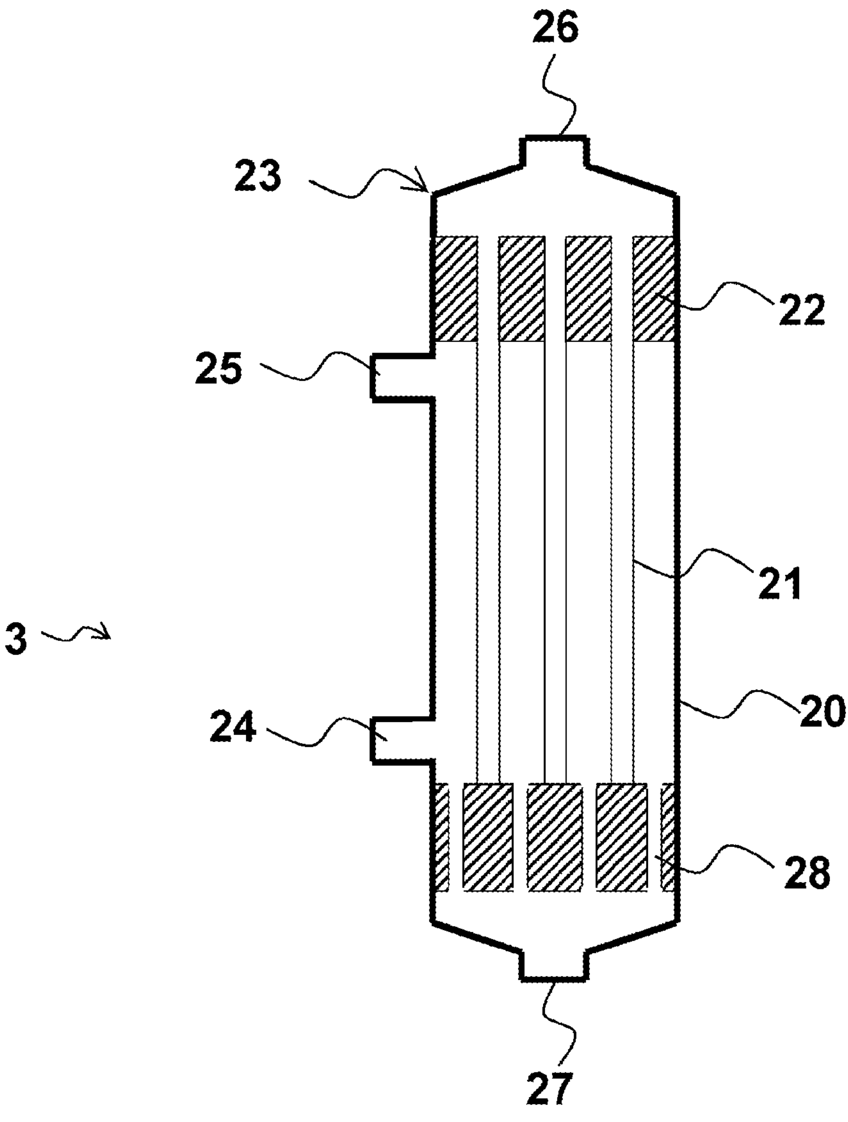
FIG. 2 is a schematic view showing an example of a separation membrane module to which the present invention is applied.

Hereinafter, the present invention will be described in more detail based on the embodiments shown in the drawings. The present invention is not limited to the following embodiments.

Figure 1:
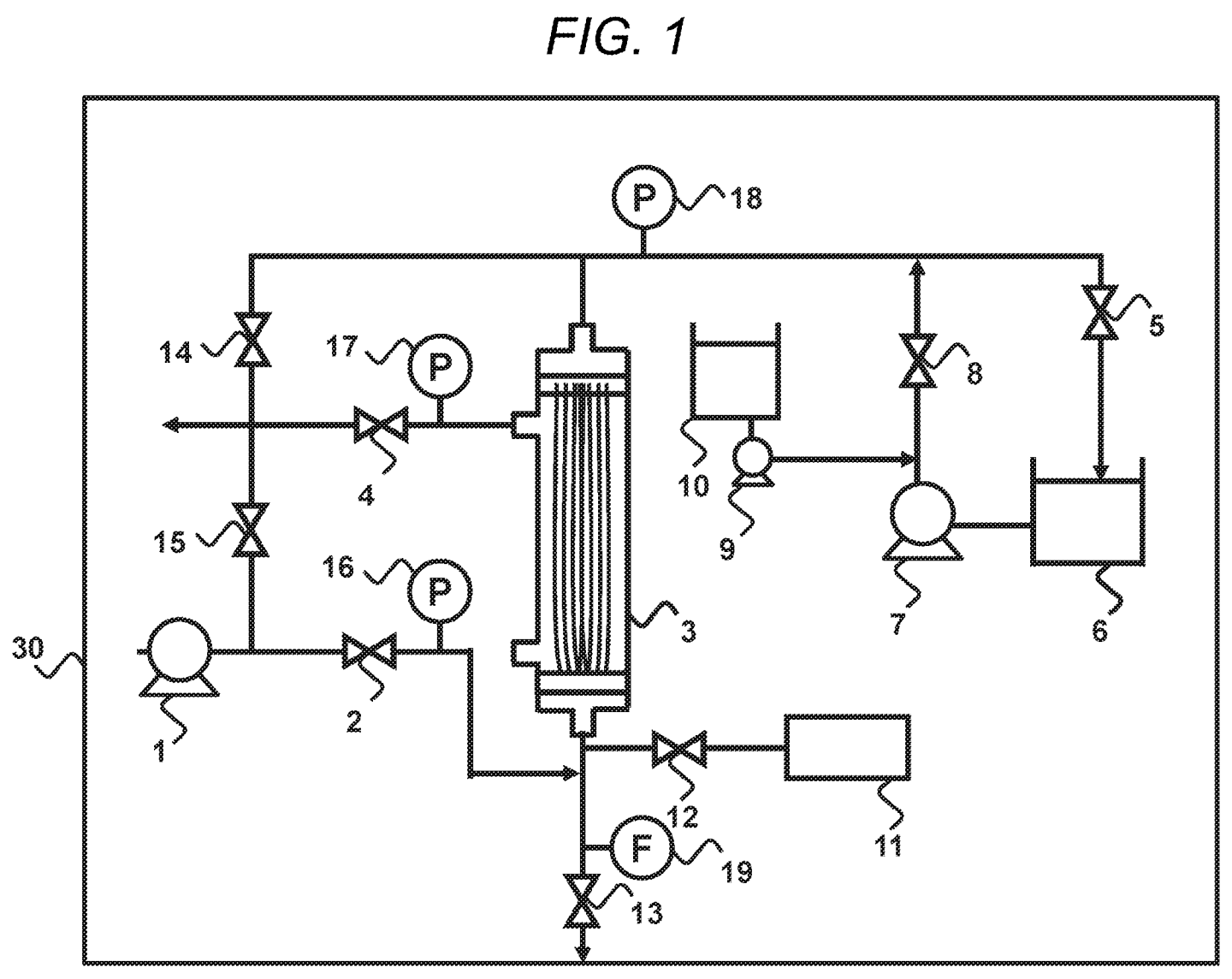

The present invention relates to a method for operating a separation membrane module, a management program, and a water production system, and includes a method for identifying a clogged portion of a separation membrane module. A device to which the present invention is applied is provided with, for example, as shown in FIG. 1, an water-to-be-treated supply pump 1 that supplies water-to-be-treated, an water-to-be-treated supply valve 2 that is opened when the water-to-be-treated is supplied, a separation membrane module 3 that filters the water-to-be-treated, a backwash drain valve 4 that is opened when backwashing or air washing is performed, a treated water discharge valve 5 that is opened at the time of membrane filtration, a treated water storage tank 6 that stores treated water, a backwash pump 7 that supplies the treated water to the separation membrane module 3 and performs backwashing, a backwash valve 8 that is opened when the backwashing is performed, a chemical liquid supply pump 9 that supplies a chemical liquid to the water-to-be-treated or the separation membrane module, a chemical liquid storage tank 10 that stores the chemical liquid, an air blower 11 that is an air supply source for air washing of the separation membrane module 3, an air washing valve 12 that is opened when the air washing is performed by supplying air to a lower portion of the separation membrane module 3, a drain valve 13 that is opened when the water-to-be-treated or washing wastewater on a primary side of the separation membrane module 3 is discharged, a treated water supply valve 14 to the primary side, an water-to-be-treated bypass valve 15, a primary side supply pressure sensor 16 that measures a pressure (P1) of a water-to-be-treated supply part, a primary side outlet pressure sensor 17 that measures a pressure (P3) of a backwashing wastewater discharge part, a secondary side pressure sensor 18 that measures a pressure (P2) of a treated water discharge part, and a water discharge flow rate sensor 19. The water-to-be-treated is a solution to be treated using the separation membrane module, and examples thereof include river water, groundwater, seawater, treated sewage water, industrial wastewater, a culture solution, and the like.

A pore diameter of a separation membrane used in the separation membrane module 3 is not particularly limited as long as it is porous, and a microfiltration membrane (MF membrane), an ultrafiltration membrane (UF membrane), or a combination thereof may be used depending on desired properties and amount of water-to-be-treated. For example, when it is desired to remove suspended components, *Escherichia coli*, *cryptosporidium*, and the like, either the MF membrane or the UF membrane may be used, but when it is desired to remove viruses, polymeric organic substances, and the like, the UF membrane is preferably used. A form of the separation membrane may be any of a hollow fiber membrane, a flat membrane, a tubular membrane, a monolith membrane, and the like.

A material of the separation membrane preferably includes at least one selected from the group consisting of polyethylene, polypropylene, polyacrylonitrile, an ethylene-tetrafluoroethylene copolymer, polychlorotrifluoroethylene, polytetrafluoroethylene, polyvinyl fluoride, a tetrafluoroethylene-hexafluoropropylene copolymer, a tetrafluoroethylene-perfluoroalkyl vinyl ether copolymer, a chlorotrifluoroethylene-ethylene copolymer, polyvinylidene fluoride, polysulfone, cellulose acetate, polyvinyl alcohol, polyether sulfone, and inorganic materials such as ceramics. Further, polyvinylidene fluoride (PVDF) is more preferred in view of a membrane strength and chemical resistance, and polyacrylonitrile is more preferred in view of high hydrophilicity and improved contamination resistance. In addition, the separation membrane module 3 has a case in which a separation membrane is inserted, and has at least the water-to-be-treated supply part, the backwashing wastewater discharge part, and the treated water discharge part. A shape of the case is not particularly limited, such as a cylindrical shape or a polygonal shape.

FIG. 2 shows an example of the separation membrane module to which the present invention is applied, in the separation membrane module, a plurality of hollow fiber membranes are inserted as separation membranes 21 into a cylindrical case 20, and the hollow fiber membranes are bonded and fixed by potting materials 22 at both ends of the cylindrical case 20. In a bonded and fixed portion in an upper portion of the membrane module, a hollow portion of the hollow fiber membrane is open, and a removable cap 23 is attached thereto. On the other hand, in a bonded and fixed portion in a lower portion of the membrane module, an end portion of the hollow fiber membrane is blocked by the potting material 22. A lower side nozzle 24 and an upper side nozzle 25 communicating with an outer side of the hollow fiber membrane are provided on a side surface of the cylindrical case 20 on an inner side from the bonded and fixed portions at both ends of the cylindrical case 20. The lower side nozzle 24 can be used as the water-to-be-treated supply part, and the upper side nozzle 25 can be used for air bleeding, water-to-be-treated discharging, or the backwashing wastewater discharge part during backwashing. Since a lower nozzle 27 is used as an air supply part for air washing or the backwashing wastewater discharge part, a through hole 28 is provided in the bonded and fixed portion in the lower portion of the membrane module. During the filtration operation, the supplied water-to-be-treated is filtered by the hollow fiber membrane, and the treated water can be obtained from an upper nozzle 26 (treated water discharge part). In a case where an operation is performed without using the lower side nozzle or in a case of a module form in which a lower side nozzle does not exist, the lower nozzle 27 can be used not only as the air supply part or the backwashing wastewater discharge part but also as the water-to-be-treated supply part. FIG. 1 shows a mode in which the lower nozzle is used as the water-to-be-treated supply part. A filling rate of the hollow fiber membranes in the cylindrical case is generally 30% or more and 80% or less. When the filling rate is too low, there is a possibility that the hollow fiber membranes are excessively shaken at an interface of the bonded and fixed portion when water is flowed at a high flow rate, and the hollow fiber membranes are broken. When the filling rate is too high, it is difficult to insert a hollow fiber membrane bundle into the cylindrical case in a manufacturing process of the hollow fiber membrane module. Here, the filling rate of the hollow fiber membranes refers to a ratio of a portion occupied by hollow fiber membranes included in the hollow fiber membrane bundle to a portion surrounded by hollow fiber membranes disposed on the outermost periphery of the hollow fiber membrane bundle in a small diameter portion.

A material of the cylindrical case 20 is not particularly limited, and examples thereof include a container made of a resin such as ABS, polypropylene, vinyl chloride, and polycarbonate, a container made of a fiber-reinforced resin reinforced with reinforcing fibers such as glass fibers and carbon fibers in an epoxy resin, a urethane resin, and the like, and a container made of a metal such as stainless steel. Examples of a material of the potting material 22 include epoxy and polyurethane.

The "primary side" refers to a side to which the water-to-be-treated is supplied in a space partitioned by the separation membrane, and the "secondary side" refers to a side of treated water obtained by filtering the water-to-be-treated with the separation membrane.

Figure 3:
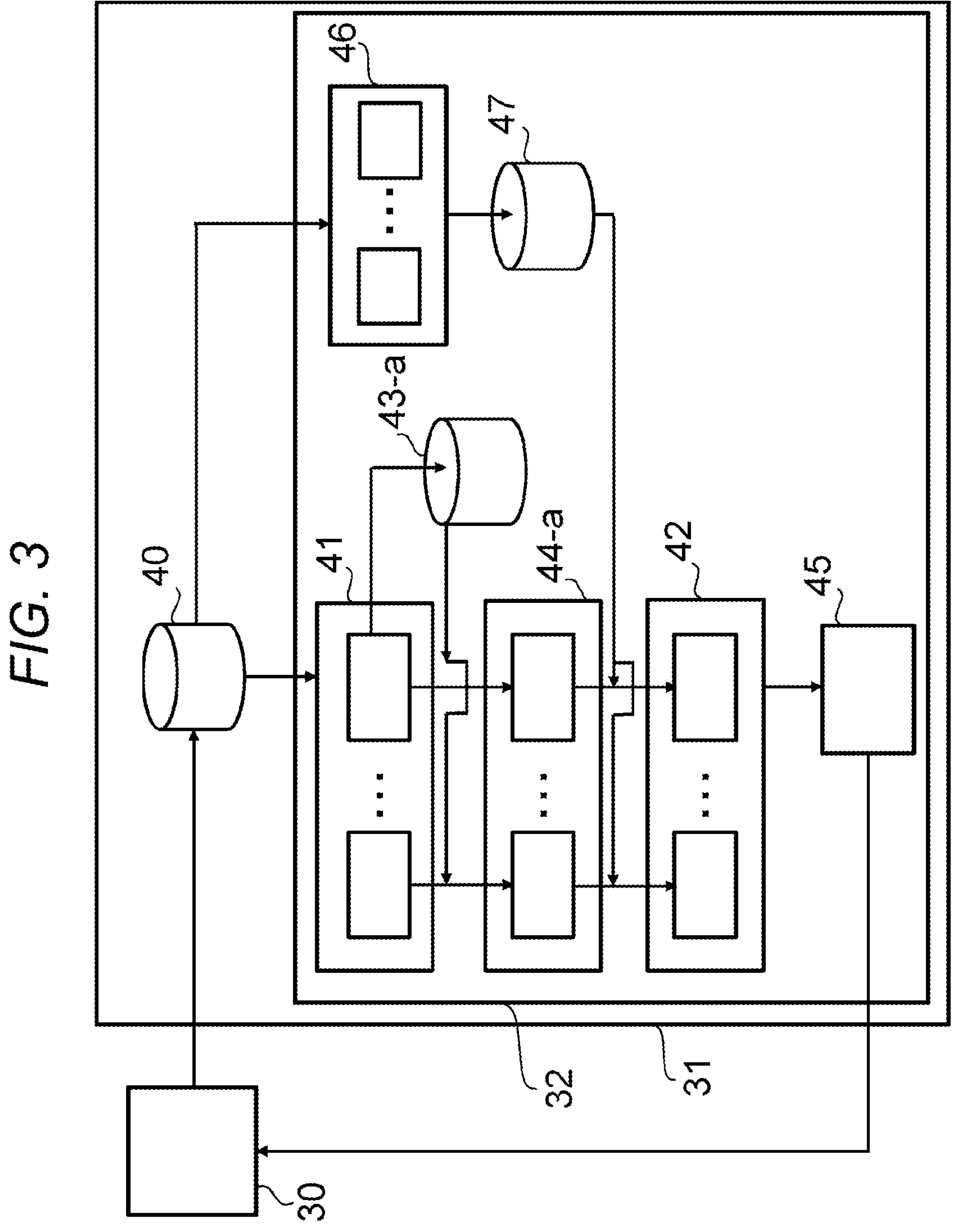
FIG. 3 is a schematic view showing an embodiment of the present invention.

The identification of the clogged portion in the embodiment of the present invention is characterized by including the following means, for example, as shown in FIG. 3. First, an operation data recording unit 40 and a clogged portion identifying program 32 are introduced into a computer 31 that obtains operation data from a water production system 30.

In the water production system 30 illustrated in FIG. 1, the water-to-be-treated is supplied to the primary side in the separation membrane module 3 by operating the water-to-be-treated supply pump 1 and opening the water-to-be-treated supply valve 2 and the backwash drain valve 4. After the primary side is filled with the water-to-be-treated in the water supply process of the water-to-be-treated, the backwash drain valve 4 is closed and the treated water discharge valve 5 is opened, thereby proceeding to a filtration process in which filtration is performed by the separation membrane provided in the separation membrane module 3. The water supply process may be omitted. If an exhaust valve, although not shown, is provided between the backwash drain valve 4 and the upper side nozzle 25 of the separation membrane module, air can be automatically pushed out even when the backwash drain valve 4 is closed and the treated water discharge valve 5 is opened in a state where air is present on the primary side of the separation membrane module 3 to start the filtration process. In the filtration process, the treated water is transferred from the secondary side of the separation membrane module 3 to the treated water storage tank 6 via the treated water discharge valve 5. In a case of dead-end filtration, the backwash drain valve 4, the backwash valve 8, the air washing valve 12, and the drain valve 13 are all closed. Pressures on the primary side and the secondary side of the separation membrane module during the filtration process are measured by using the primary side supply pressure sensor 16, the primary side outlet pressure sensor 17, and the secondary side pressure sensor 18, respectively, and are recorded in the operation data recording unit 40. Although not shown, operation data such as a filtration flow rate and a water temperature are also measured and recorded in the operation data recording unit 40.

A filtration method includes a dead-end filtration method and a cross-flow filtration method. In the cross-flow filtration method, filtration is performed while discharging a part of the water-to-be-treated by adjusting an opening degree without fully closing the backwash drain valve 4 in the filtration process. Either of the filtration methods may be used, but from the viewpoint of low energy consumption, a dead-end filtration module is preferable. In addition, as will be described later, in the determination of clogging of the separation membrane module according to the embodiment of the present invention, the dead-end filtration module is preferable.

A filtration resistance of the separation membrane module increases according to a filtration elapsed time. That is, in a case of a constant flow rate filtration operation, a pressure difference (generally, "P2−P1") between the primary side and the secondary side of the membrane module increases. In order to reduce this increase, it is common to periodically perform physical washing and operate while repeating the filtration and the physical washing. It is preferred to appropriately set a filtration time in accordance with properties of the water-to-be-treated or a membrane filtration flux, but the filtration time may be continued until a predetermined transmembrane filtration differential pressure is reached.

In the physical washing, it is common to temporarily stop the filtration, and perform the backwashing process, the air washing process, the water discharge process, and the water supply process in this order, but there is no problem even when the backwashing process and the air washing process are simultaneously performed, the backwashing process is performed after the water discharge process, or any one of the processes is omitted or performed a plurality of times.

After the filtration process is completed, the process proceeds to the backwashing process in which the water-to-be-treated supply pump 1 is stopped, the water-to-be-treated supply valve 2 and the treated water discharge valve 5 are closed, the backwash valve 8 and the backwash drain valve 4 are opened, and the backwash pump 7 is operated for pressure-feeding from the secondary side to the primary side of the separation membrane module. Pressures on the primary side and the secondary side of the separation membrane module during the backwashing process are measured by using the primary side supply pressure sensor 16, the primary side outlet pressure sensor 17, and the secondary side pressure sensor 18, respectively, and are recorded in the operation data recording unit 40. Although not shown, the operation data recording unit 40 is not particularly limited as long as it is data relating to the operation, and for example, the flow rate and the water temperature of backwashing water are also recorded in the operation data recording unit 40.

The backwashing water is not particularly limited, and it is preferable to use the treated water obtained by filtering the water-to-be-treated with the separation membrane module as in the present embodiment, but industrial water, clean water, tap water, RO membrane-permeated water, or pure water may be used. A backwashing time is not particularly limited, and is preferably in a range of 1 second to 120 seconds. When the backwashing time for one backwashing is less than 1 second, a sufficient washing effect cannot be obtained, and when the backwashing time exceeds 120 seconds, an operation rate and a water recovery rate of the separation membrane module are reduced.

After the backwashing process is completed, the process proceeds to the air washing process in which the backwash pump 7 is stopped, the backwash valve 8 is closed, the air washing valve 12 is opened, and the air blower 11 is operated to perform washing by supplying air to the separation membrane module 3. An air washing time is not particularly limited, and is preferably in a range of 1 second to 120 seconds. When the backwashing time for one washing is less than 1 second, a sufficient washing effect cannot be obtained, and when the backwashing time exceeds 120 seconds, the operation rate of the separation membrane module is reduced. The air washing process may be introduced in the middle of the backwashing process by opening the air washing valve 12 and operating the air blower 11.

After the air washing process is completed, the air blower 11 is stopped, the air washing valve 12 is closed, and the drain valve 13 is opened, and the process proceeds to the water discharge process of discharging all of the washing wastewater accumulated in the separation membrane module 3. In the water discharge process, the backwash drain valve 4 and the drain valve 13 are opened, and the water-to-be-treated on the primary side is discharged from the lower portion of the separation membrane module. In the water discharge process, a primary side pressure in the separation membrane module or a water discharge flow rate is measured by using the primary side supply pressure sensor 16 or the water discharge flow rate sensor 19, and is recorded in the operation data recording unit 40. Thereafter, the process returns to the water supply process of water-to-be-treated, and the membrane filtration operation is continued.

As illustrated in FIG. 3, the present invention is characterized in that the operation data recorded in the operation data recording unit 40 is subjected to calculation processing by a difference calculation unit 41 and a water discharge process calculation unit 46 included in the clogged portion identifying program 32, and the clogged portion of the separation membrane module is identified by a clogged portion identifying unit 42.

Examples of a specific method included in the difference calculation unit 41 include difference calculation methods 1 to 4.

In the difference calculation method 1, a pressure difference (ΔP1) between the pressure (P1) of the water-to-be-treated supply part and the pressure (P3) of the backwashing wastewater discharge part in the filtration process of filtering the water-to-be-treated from the primary side to the secondary side of the separation membrane module is obtained as a first resistance R1.

In the difference calculation method 2, a pressure difference (ΔP2) between the pressure (P3) of the backwashing wastewater discharge part and the pressure (P2) of the treated water discharge part in the filtration process of filtering the water-to-be-treated from the primary side to the secondary side of the separation membrane module is obtained as a second resistance R2.

In the difference calculation method 3, a pressure difference (ΔP3) between the pressure (P1) of the water-to-be-treated supply part and the pressure (P3) of the backwashing wastewater discharge part in the backwashing process of pressure-feeding from the secondary side to the primary side of the separation membrane module is obtained as a third resistance R3.

In the difference calculation method 4, a pressure difference (ΔP4) between the pressure (P2) of the treated water discharge part and the pressure (P1) of the water-to-be-treated supply part in the backwashing process of pressure-feeding from the secondary side to the primary side of the separation membrane module is obtained as a fourth resistance R4.

When the pressure differences are calculated, P3 in the filtration process and P1 in the backwashing process are preferably static pressures. In addition, when installation heights of pressure gauges for measuring the pressures P1 to P3 are different from each other, it is preferable to perform correction in consideration of a water head difference.

In a case where the water production system performs an operation process of constant flow rate filtration (that is, the filtration process and the backwashing process each continue to be operated with the same flow flux from the start of the operation), the first resistance R1 to the fourth resistance R4 are calculated based on the following:

$$R1 \approx \Delta P1 = P1 - P3 \text{ (during filtration process)}$$

$$R2 \approx \Delta P2 = P3 - P2 \text{ (during filtration process)}$$

$R3 \approx \Delta P3 = P1 - P3$ (during backwashing process)

$R4 \approx \Delta P4 = P2 - P1$ (during backwashing process).

When the second resistance R2 and the fourth resistance R4 are pressure difference data, it is preferable to set the same flow flux in the filtration process and the backwashing process, or to correct the pressure difference depending on the flow rate. In a case where the flow fluxes (flow rates) of the filtration process and the backwashing process do not coincide with each other, or in a case where a filtration flux changes with time during a continuous operation such as the constant pressure filtration operation, it is preferable to correct each pressure difference ΔP in consideration of the flow rate at the time of pressure measurement. When the pressure difference is corrected by the flow rate, it is preferable to perform the calculation by pressure difference/flow rate. When pressure differences acquired at times of different water temperature are compared, it is preferable to further perform viscosity correction on differential pressure data based on the water temperature.

Details will be described later, the second resistance R2 and the fourth resistance R4 are indexes indicating the filtration resistances of the separation membrane portion. It is also preferable to calculate the resistance values based on the pressure difference data, flow flux data, and water temperature data such that the second resistance R2 and the fourth resistance R4 with the same preconditions can be compared even when measurement conditions (flow flux and water temperature) are different. In this case, the calculation is performed by the following formulae. The first resistance R1 and the third resistance R3 are indexes indicating a flow path resistance (pressure loss) on the primary side of the separation membrane module, and vary depending on flow flux conditions during the filtration process or the backwashing process. Therefore, pressure difference data acquired by equalizing the flow flux conditions, or water temperature correction values of the pressure difference data may be used as the first resistance R1 and the third resistance R3.

Second resistance $R2$ (l/m)=$\Delta P2$ (Pa)/(filtered water viscosity (Pa·s)×filtration flux (m/s))

Fourth resistance $R4$ (l/m)=$\Delta P4$ (Pa)/(filtered water viscosity (Pa·s)×backwash flux (m/s))

Based on the change in each resistance (pressure difference) obtained by the above-mentioned calculation processing, the present inventors have found that, the clogged portion of the separation membrane module can be roughly sorted into three portions, that is, the lower portion on the primary side of the separation membrane module (the vicinity of the water-to-be-treated supply part), the separation membrane, and the upper portion on the primary side of the separation membrane module (the vicinity of the backwashing wastewater discharge part), and further, the clogging of the separation membrane portion can be sorted into two types of clogging methods. Clogging on the primary side of the separation membrane module (increase in resistance due to accumulation of suspended matters) occurs, for example, in a case where only a portion where the separation membrane module is easily to be washed is washed and a portion where washing is insufficient occurs, or in a case where physical washing is insufficient due to inflow of highly turbid water more than expected due to heavy rain or the like. The clogged portion varies depending on the shape and specific gravity of the suspended matters, the operating conditions and shape of the separation membrane module, and the like, but due to a flow of water in the separation membrane module during the washing process, accumulation of the suspended matters does not occur in the vicinity of the center of the primary side of the separation membrane module (between separation membranes), and most of the suspended matters are in the lower portion on the primary side or the upper portion on the primary side of the separation membrane module. In a form of the separation membrane module illustrated in FIG. 2, since water flows in and out via the lower side nozzle 24 or the lower nozzle 27 which are water-to-be-treated supply parts, accumulation of the suspended matters is likely to occur in the lower portion on the primary side of the separation membrane module, that is, between hollow fiber membranes in the vicinity of a lower potting material, or in the vicinity of the through hole 28. In addition, when water flows in and out via the upper side nozzle 25 which is the backwashing wastewater discharge part, and during the air washing process, accumulation of suspended matters occurs in the upper portion on the primary side of the separation membrane module, that is, between the hollow fiber membranes in the vicinity of the upper potting material. One type of clogging method of the separation membrane portion is a clogging method in which a substance to be removed in the water-to-be-treated adheres and accumulates on the inside of the membrane pores or on the membrane surface with the continuation of filtration, whereby the pores of the separation membrane are clogged or the pore diameter is substantially reduced, and the resistance of the separation membrane portion is increased. The other type of clogging method is a clogging method in which a part of a deposited layer of the adhered substance on the surface of the separation membrane is fixed to the separation membrane and acts as a check valve, and is a clogging method in which the resistance of the separation membrane portion is generated in the filtration process, but the resistance is not generated in the backwashing process (a state where adhered materials remain without being completely removed from the membrane).

It is basically possible to identify the clogged portion by using the method in the related art for identifying the clogged portion of the separation membrane module described in Patent Literature 3. However, operation data of at least three processes of the water supply process, the filtration process, the backwashing process, and the water discharge process is required, and a clogged portion can be identified only by performing a calculation combining the operation data of the respective processes, so that the calculation process is complicated. In addition, in a case where the water supply process is performed after the water discharge process, since a flow rate and a pressure are likely to be unstable immediately after the start of the water supply process, a long time is required to acquire stable data, or the method may not be applied to an operation in which the three processes are not all performed, for example, an operation in which the water supply process and or water discharge process is not performed. On the other hand, according to the difference calculation method according to the embodiment of the present invention, it is possible to identify the clogged portion of the separation membrane module by the operation data of a single process. Further, since only operation data of two processes of the filtration process and the backwashing process is used, the calculation process is simple, and the clogged portion of the separation membrane module can be identified more quickly and more accurately than in the related art.

Figures 5A, 5B:
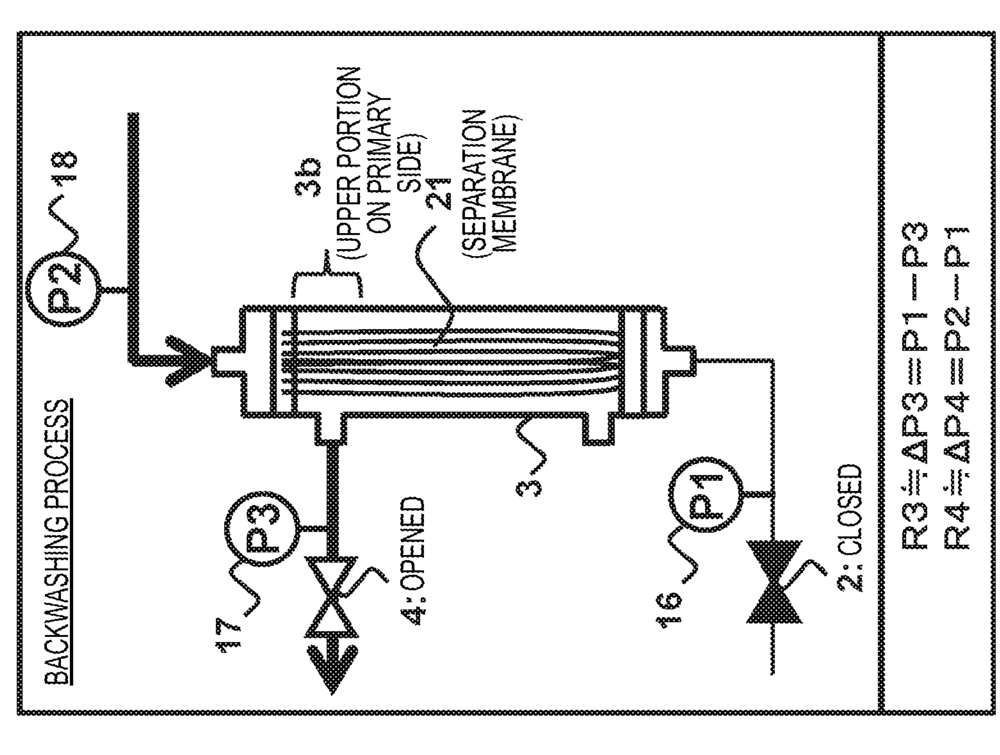
FIG. 5A and FIG. 5B are schematic views showing embodiments of the present invention.

As shown in FIG. 5A, the first resistance R1 of the difference calculation method 1 is an index indicating a degree of clogging (increase in resistance) in the vicinity of a lower portion 3*a* on the primary side of the separation membrane module in the case of dead-end filtration. R1 can be obtained based on the difference (ΔP1) between a pressure on a primary inlet side and a pressure on a primary outlet side of the separation membrane module during the filtration process, and indicates the flow path resistance (pressure loss) on the primary side of the separation membrane module. In the case of dead-end filtration, since P3 is a static pressure, there is almost no flow of water-to-be-treated in an upper portion 3*b* on the primary side of the separation membrane module close to a P3 measurement portion (in the vicinity of the backwashing wastewater discharge part), and thus a pressure loss does not occur. That is, it can be considered that when R1 calculated during the dead-end filtration process increases over time, clogging of the lower portion 3*a* on the primary side of the separation membrane module (in the vicinity of the water-to-be-treated supply part), which is a portion in which a flow of the water-to-be-treated is present and accumulation of suspended matters is likely to occur, increases. When P1 and P3 are measured in a state where the backwash drain valve 4 is opened as in the water supply process of the water-to-be-treated or the cross-flow filtration, P1 and P3 are dynamic pressures, and R1 calculated in this state includes a flow path resistance generated in the upper portion on the primary side of the separation membrane module in addition to that in the lower portion on the primary side of the separation membrane module. Therefore, in the case of cross-flow filtration, the degree of clogging in the lower portion on the primary side of the separation membrane module can be quantified by subtracting the flow path resistance generated in the upper portion on the primary side of the separation membrane module from the calculated first resistance R1. For example, when the third resistance R3 calculated by the difference calculation method 3 is used, the calculation result of R1−R3 becomes a clogging index of the lower portion on the primary side of the separation membrane module.

As shown in FIG. 5A, in the case of dead-end filtration, the second resistance R2 in the difference calculation method 2 is a clogging index of a first separation membrane portion, that is, an index indicating the degree of clogging (increase in resistance) of the separation membrane portion at the time of the filtration process of the separation membrane module. R2 can be obtained based on the pressure difference (ΔP2) between the pressure (P3) of the backwashing wastewater discharge part and the pressure (P2) of the treated water discharge part at the time of the filtration process. As described above, in the case of dead-end filtration, the pressure (P3) of the backwashing wastewater discharge part is a static pressure. That is, since the flow path resistance generated on the primary side of the separation membrane module is not included, R2 can be regarded as the filtration resistance generated in the separation membrane 21. In the case of cross-flow filtration, the pressure (P3) of the backwashing wastewater discharge part is a dynamic pressure, and in a case where there is clogging in the upper portion on the primary side of the separation membrane module, P3 is a pressure loss value. Since the pressure measured as P3 has a value smaller than a pressure actually used for the filtration, R2 at the time of the cross-flow filtration estimates the filtration resistance of the separation membrane 21 to be excessively small. For this reason, in the case of cross-flow filtration, it is necessary to perform a calculation of further adding the flow path resistance generated in the upper portion on the primary side of the separation membrane module to the calculated R2. For example, the clogging index of the first separation membrane portion can be obtained by performing a calculation of R2+R3 using the third resistance R3 calculated by the difference calculation method 3. In general, P2−P1 is used as an index of an operation differential pressure, but in this case, an influence of the clogging in the lower portion on the primary side of the separation membrane module is included in addition to the clogging of the separation membrane.

As shown in FIG. 5B, the third resistance R3 in the difference calculation method 3 is an index indicating the degree of clogging (increase in resistance) in the upper portion 3*b* on the primary side of the separation membrane module. The pressure (P1) of the water-to-be-treated supply part as the primary inlet side of the separation membrane module in the backwashing process is measured, the pressure (P3) of the backwashing wastewater discharge part as the primary outlet side is measured, and R3 can be obtained based on the difference (ΔP3) between the pressures. The pressure (P1) of the water-to-be-treated supply part is preferably measured by a static pressure. When the backwashing process is performed by opening the backwash drain valve 4 among the valves related to the separation membrane module and closing the other valves, the pressure (P1) of the water-to-be-treated supply part can be measured as the pressure on the primary inlet side of the separation membrane module, and the pressure (P3) of the backwashing wastewater discharge part can be measured as the pressure (static pressure) on the primary outlet side of the separation membrane module. Accordingly, since no flow path resistance is generated in the lower portion on the primary side of the separation membrane module, R3 can be regarded as the flow path resistance generated in the upper portion on the primary side of the separation membrane module. For example, in a case of a mode in which the backwashing process of discharging the backwashing wastewater from the water-to-be-treated supply part is performed by opening the backwash valve 8 and the drain valve 13 among the valves related to the separation membrane module and closing the other valves in the device shown in FIG. 1, the pressure (P3) of the backwashing wastewater discharge part is a static pressure. In this case, the difference between the pressure (P1) of the water-to-be-treated supply part and the pressure (P3) of the backwashing wastewater discharge part is an index indicating the degree of clogging (increase in resistance) in the lower portion on the primary side of the separation membrane module, and is synonymous with R1 at the time of the dead-end filtration process described above.

As shown in FIG. 5B, the fourth resistance R4 in the difference calculation method 4 is a clogging index of a second separation membrane portion, that is, an index indicating the degree of clogging (increase in resistance) of the separation membrane portion at the time of the backwashing process of the separation membrane module. The pressure (P2) of the treated water discharge part as a secondary inlet side of the separation membrane module in the backwashing process is measured, the pressure (P1) of the water-to-be-treated supply part is measured as the pressure (static pressure) of the primary inlet side, and the difference (ΔP4) therebetween can be obtained. In order to measure a pressure measurement portion at a primary side inlet of the separation membrane module with static pressure, it is necessary to discharge the backwashing wastewater from the backwashing wastewater discharge part of the separation membrane module. In the case of a mode in which the backwashing wastewater is discharged from the water-to-be-treated supply part, P3 is measured as the pressure on the primary inlet side of the separation membrane module, and P3−P2 is calculated, whereby the clogging index of the second separation membrane portion can be obtained.

Although not particularly limited, the upper portion on the primary side of the separation membrane module refers to a portion of 70% or more from an water-to-be-treated supply side in a longitudinal direction of the separation membrane module (the vicinity of the upper potting material), and the lower portion on the primary side of the separation membrane module refers to a portion of 30% or less from an water-to-be-treated supply side in the longitudinal direction of the separation membrane module (the vicinity of the lower potting material). When a hollow fiber membrane is used as the separation membrane, since the water-to-be-treated supply side is often located on the lower side with respect to the direction of gravity, the upper portion on the primary side and the lower portion on the primary side are expressed as described above.

The clogged portion of the separation membrane module is identified by recording amounts of change from the initial values of respective indexes obtained by the above-mentioned calculation in a change amount recording unit 43-*a* and comparing the amounts of change with a change amount comparing unit 44-*a*.

As a specific method included in the water discharge process calculation unit 46, a pressure fluctuation rate (kPa/sec) or the water discharge flow rate (L/min) is calculated based on the measured primary side pressure in the separation membrane module.

rate. When the water discharge state of the separation membrane module deteriorates, the primary side pressure fluctuation rate or the water discharge flow rate decreases, and the suspended matters separated from the separation membrane in the backwashing process or the air washing process are not sufficiently discharged, and accumulation of the suspended matters into the separation membrane module progresses. The deterioration of the water discharge state of the separation membrane module is roughly classified into deterioration due to clogging of the separation membrane module itself, in particular, the lower portion on the primary side of the separation membrane module, and deterioration due to an air-intake state of the device. In the former deterioration, the primary side pressure fluctuation rate or the water discharge flow rate is reduced since the flow path on the primary side of the separation membrane module is physically blocked, and in the latter deterioration, the primary side pressure fluctuation rate or the water discharge flow rate is reduced due to a reduction in an intake air from the backwash drain valve 4 depending on an operation state of the other system, in terms of the device configuration or in a case where separation membrane modules of a plurality of systems are operated. The reason for the deterioration of the water discharge state can be identified by combining with the calculation of the clogged portion of the separation membrane module.

Table 1 shows an outline of methods (clogging identification method and washing method) for operating the separation membrane module according to the present invention.

TABLE 1

| Clogged portion of separation membrane module | Clogging determination method | Washing method for clogging (control unit) |
|---|---|---|
| Lower portion on primary side | Comparing amounts of change or rates of change from respective initial values of R1, R2, and R3, "amount of change or rate of change of R1 > amount of change or rate of change of R2 and amount of change or rate of change of R3" or "amount of change or rate of change of R1 > set value" | a, b, c |
| Separation membrane portion | Comparing amounts of change or rates of change from respective initial values of R1, R2, and R3, "amount of change or rate of change of R2 > amount of change or rate of change of R1 and amount of change or rate of change of R3" or "amount of change or rate of change of R2 > set value" | f, g, h |
| Upper portion on primary side | Comparing amounts of change or rates of change from respective initial values of R1, R2, and R3, "amount of change or rate of change of R3 > amount of change or rate of change of R1 and amount of change or rate of change of R2" or "amount of change or rate of change of R3 > set value" | d, e |
| Surface of separation membrane | "Difference (R2-R4) > set value" or "ratio (R2/R4) > set value" | g, h, i |

Figure 4:
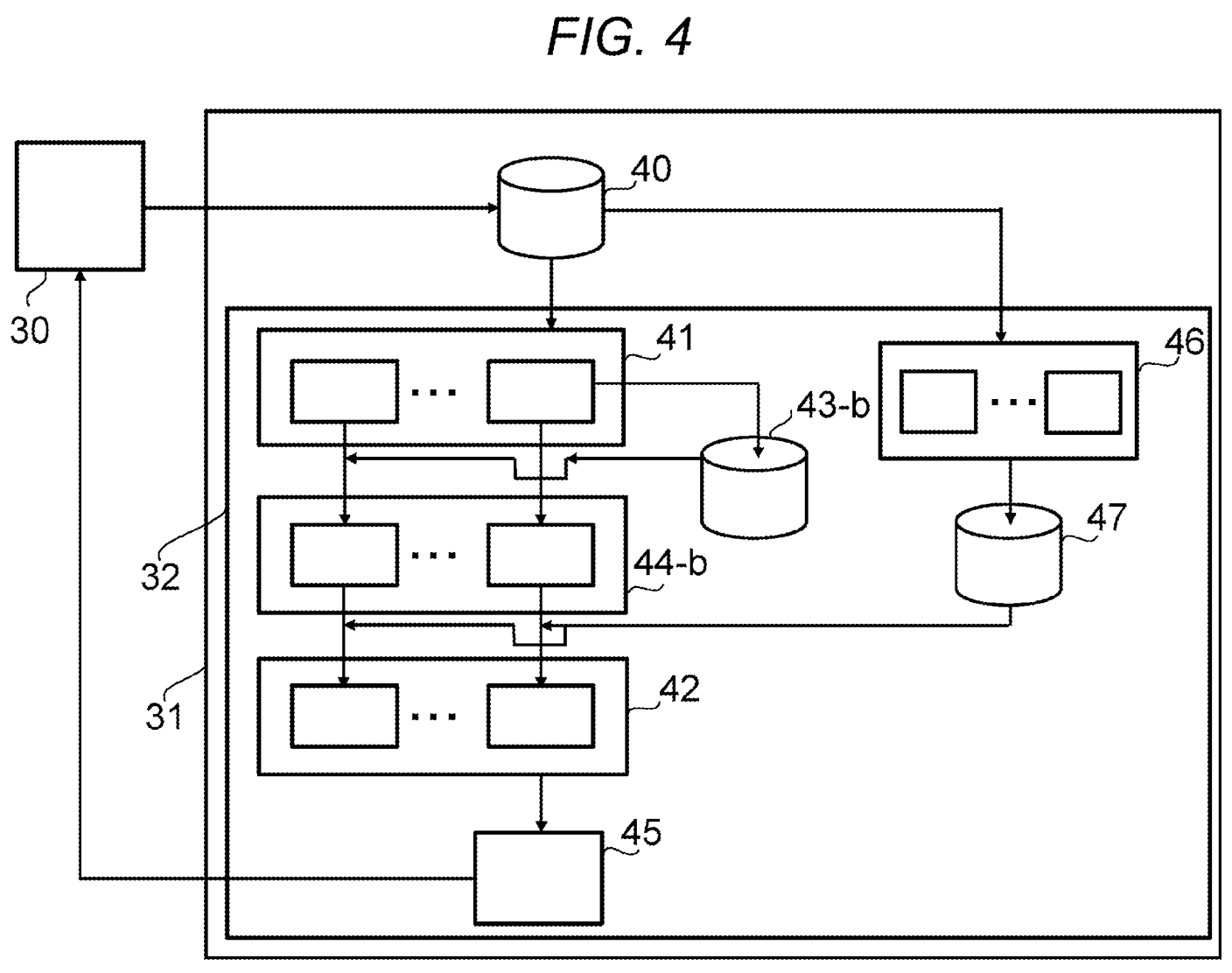

The primary side pressure (P1) at the time of the water discharge process indicates a water head on the primary side of the separation membrane module, and a change in a water discharge state of the separation membrane module can be grasped by calculating a primary side pressure fluctuation The amount of change from the initial value of the first resistance R1 indicating the resistance of the lower portion on the primary side of the separation membrane module is compared with the amount of change from the initial value of the resistance (second resistance R2) due to clogging of the separation membrane of the separation membrane module and the amount of change from the initial value of the resistance (third resistance R3) of the upper portion on the primary side of the separation membrane module. When the amount of change from the initial value of the first resistance R1 is the largest, or when the amount of change from the initial value of the first resistance R1 is larger than a set value, the clogged portion identifying unit 42 determines that the water-to-be-treated supply part and/or the lower portion on the primary side of the separation membrane module is the clogged portion. Then, the lower portion on the primary side of the separation membrane module is washed more intensively than other portions. In addition, in the above-mentioned comparison, instead of the amount of change from the initial value of the value obtained by the above-mentioned calculation, a rate of change may be recorded in a change rate recording unit 43-*b* as shown in FIG. 4, and respective rates of change may be compared using a change rate comparing unit 44-*b*.

Here, the initial value refers to the first resistance R1 to the fourth resistance R4 (values of the pressure differences, the resistances, or the like) at the time of manufacturing the separation membrane module, at the time of starting the operation of the water production system, at the time of starting the operation after chemical washing, at the time of the previous calculation processing, or the like. The set value refers to an amount of change, a rate of change, or the like of the first resistance R1 to the fourth resistance R4 which are determined in advance in order to determine the clogging, or an amount of change, a rate of change, or the like of a value calculated by combining the first resistance R1 to the fourth resistance R4. In setting the initial value and the set value, it is necessary to set the initial value and the set value in consideration of acquisition conditions and calculation conditions of the pressure difference data (the first resistance R1 to the fourth resistance R4) acquired for performing the clogging determination. For example, when the initial value and the pressure difference data of a clogging determination target are the same in the acquisition conditions (the flow flux, the water temperature condition, or the like), the pressure difference data may be directly compared with the initial values as the first resistance R1 to the fourth resistance R4, but when the flow flux or the water temperature is different, it is preferable to set the pressure difference data or the resistance values corrected in consideration of the flow flux or the water temperature as the initial values.

As the intensive washing, it is effective to perform at least one of a control a, a control b, and a control c by a control unit 45. In the control a, washing is performed in which the backwash drain valve 4 and the drain valve 13 are opened, and a water level is lowered until the periphery of the separation membrane on the primary side is filled with gas, and then the drain valve 13 is closed, the backwash valve 8 and the air washing valve 12 are opened, and air washing is performed while raising and lowering the liquid surface on the primary side. In the control b, the process time of the water discharge process is lengthened. In the control c, pressurized water discharge is performed in which water is discharged by pressurizing the primary side of the separation membrane module by air during the water discharge process, or backwashing lower portion water discharge is performed in which water is discharged by closing the backwash drain valve 4, opening the backwash valve 8 and the drain valve 13, and operating the backwash pump 7. Each control may be performed only once, or may be performed a plurality of times. The control a can impart an effect of eliminating air bubbles at a gas-liquid interface and a washing effect obtained by a large shaking of the liquid surface due to breakage of the air bubbles, and the water-to-be-treated supply part and/or the lower portion of the separation membrane module can be efficiently washed.

Similarly, the amount of change from the initial value of the value obtained by the above-mentioned calculation is recorded in the change amount recording unit 43-*a*, and the amount of change from the initial value of the resistance (second resistance R2) due to clogging of the separation membrane of the separation membrane module, the amount of change from the initial value of the resistance (first resistance R1) of the upper portion of the separation membrane module, and the amount of change from the initial value of the resistance (third resistance R3) of the upper portion of the separation membrane module are compared by the change amount comparing unit 44-*a*. When the amount of change from the initial value of the second resistance R2 is the largest or when the amount of change is larger than the set value, the clogged portion identifying unit 42 determines that the separation membrane is the clogged portion. Then, the separation membrane of the separation membrane module is washed more intensively than other portions. In addition, in the above-mentioned comparison, instead of the amount of change from the initial value of the value obtained by the above-mentioned calculation, a rate of change may be recorded in a change rate recording unit 43-*b* as shown in FIG. 4, and respective rates of change may be compared using a change rate comparing unit 44-*b*.

As the intensive washing, it is effective to perform at least one of a control f, a control g, and a control h by the control unit 45. In the control f, chemical liquid enhanced washing is performed during the backwashing process in which the chemical liquid supply pump 9 is operated and a chemical liquid is supplied to the separation membrane module 3 from the secondary side. In the control g, at least one of the backwashing time and the air washing time is changed. In the control h, at least one of the backwashing flow rate during the backwashing process and the air amount during the air washing process is changed. In order to further enhance the washing effect, a time during which the chemical liquid is brought into contact with the separation membrane may be set. The contact time is preferably about 5 minutes to 3 hours. This is because when the contact time is too long, a time during which the water production system 30 is stopped is increased, and the operation efficiency of the water production system 30 is reduced. Here, the chemical liquid used for washing can be selected after appropriately setting a concentration and a contact time that do not cause the membrane to be deteriorated, and the chemical liquid preferably contains at least one of sodium hypochlorite, chlorine dioxide, hydrogen peroxide, ozone, and the like because a washing effect thereof is high for organic substances, and the chemical liquid preferably contains one or more of hydrochloric acid, sulfuric acid, nitric acid, citric acid, oxalic acid, and the like because a washing effect thereof is high for aluminum, iron, manganese, and the like. The concentration of the chemical liquid is preferably 5 mg/L to 10,000 mg/L. This is because when the concentration is less than 5 mg/L, the washing effect is insufficient, and when the concentration is more than 100,000 mg/L, cost of the chemical liquid increases, which is uneconomical. Using two or more kinds of chemical liquids in order is more preferred than using one kind of chemical liquid, and it is more preferred to alternately use, for example, an acid and sodium hypochlorite. The chemical liquid is preferably supplied from the secondary side to the separation membrane module 3 as in the present embodiment, but the chemical liquid may be supplied from the primary side to the separation membrane module 3. By performing the chemical liquid enhanced washing, the clogging of the separation membrane can be efficiently washed.

Similarly, the amount of change from the initial value of the value obtained by the above-mentioned calculation is recorded in the change amount recording unit 43-*a*, and the amount of change from the initial value of the resistance (third resistance R3) of the upper portion of the separation membrane module, the amount of change from the initial value of the resistance (first resistance R1) of the lower portion of the separation membrane module, and the amount of change from the initial value of the resistance (second resistance R2) due to clogging of the separation membrane of the separation membrane module are compared by the change amount comparing unit 44-*a*. When the amount of change from the initial value of the third resistance R3 is the largest, or when the amount of change is larger than the set value, the clogged portion identifying unit 42 determines that the backwashing wastewater discharge part and/or the upper portion of the separation membrane module is the clogged portion, and the upper portion on the primary side of the separation membrane module is intensively washed than other portions. In addition, in the above-mentioned comparison, instead of the amount of change from the initial value of the value obtained by the above-mentioned calculation, a rate of change may be recorded in a change rate recording unit 43-*b* as shown in FIG. 4, and respective rates of change may be compared using a change rate comparing unit 44-*b*.

As the intensive washing, it is effective to perform at least one of a control d and a control e by the control unit 45. In the control d, the water-to-be-treated bypass valve 15, the backwash drain valve 4, and the drain valve 13 are opened and the water-to-be-treated is supplied in a reverse direction from the nozzle for discharging the washing wastewater. In the control e, the backwash pump 7 is operated to wash the separation membrane module while the backwash valve 8 and the drain valve 13 are opened after the drain valve 13 and the backwash drain valve 4 are opened and water on the primary side of the separation membrane module is discharged to make empty state. In the control d, the water-to-be-treated is preferably supplied as in the present embodiment, but treated water, industrial water, tap water, or RO membrane-permeated water may be supplied. By supplying the water-to-be-treated in the reverse direction from the nozzle for discharging the washing wastewater, the backwashing wastewater discharge part and/or the upper portion of the separation membrane module can be efficiently washed.

In the clogged portion identifying unit 42, in order to determine the clogging method of the separation membrane portion, the difference between the second resistance R2, which is the resistance due to clogging of the separation membrane portion of the separation membrane module obtained by the above-mentioned calculation, and the fourth resistance R4 is further calculated and when the difference (R2−R4) is larger than the set value, it is determined that clogging of a surface on the primary side of the separation membrane portion occurs (physical washing is insufficient), and the membrane surface of the separation membrane portion of the separation membrane module is intensively washed. Alternatively, a ratio between the second resistance R2 and the fourth resistance R4 is calculated, and when the ratio (R2/R4) is larger than a set value, the membrane surface of the separation membrane portion of the separation membrane module is intensively washed.

As the intensive washing, it is effective to perform at least one of the control g, the control h, and a control i by the control unit 45. In the control g, at least one of the backwashing time and the air washing time is changed. In the control h, at least one of the backwashing flow rate during the backwashing process and the air amount during the air washing process is changed. In the control i, at least one of the water supply process time and the water supply flow rate is changed.

In the water discharge process calculation unit 46, a pressure fluctuation rate (kPa/sec) or the water discharge flow rate (L/min) is calculated based on the measured primary side pressure in the separation membrane module. The calculated pressure fluctuation rate (kPa/sec) or water discharge flow rate (L/min) is recorded in a water discharge process calculation recording unit 47, and at least one of the pressure fluctuation rate and the water discharge flow rate is compared with a reference value, and when the pressure fluctuation rate or the water discharge flow rate is larger than the reference value, it is determined that water discharge trouble occurred. Here, the reference value indicates a primary side pressure fluctuation rate at the start of operation of a water production device or at the start of operation after the chemical washing, a calculated value or a previous calculated value at the time of wastewater flow rate calculation processing, or a set value. When the water discharge trouble is determined and the clogged portion identifying unit 42 determines that the water-to-be-treated supply part and/or the lower portion on the primary side of the separation membrane module is the clogged portion, it can be determined that the water discharge trouble is caused by the clogging of the separation membrane module. When the water discharge trouble is determined and the clogged portion identifying unit 42 determines that no clogging occurred in the water-to-be-treated supply part and/or the lower portion on the primary side of the separation membrane module, it can be determined that an abnormality occurred in a place other than the separation membrane module, that is, the air-intake state of the device deteriorated during the water discharge process.

Frequencies of the clogged portion identification and the washing method determination in the method for operating the separation membrane module are not particularly limited, but in the case of the water production system that performs a continuous operation, it is preferable to perform the identification and the determination for every filtration cycle because the clogging can be detected early when the clogging occurs. In the case of a configuration in which the water production system that performs a continuous operation cannot acquire the operation data necessary for identifying the clogged portion of the separation membrane module, the degree of clogging can be determined by replacing the separation membrane module once in several weeks to several years to another separation membrane module inspection system. That is, the present invention is preferably applied not only to an automated water production system but also to an offline inspection system that is manually operated. In this case, a minimum necessary operation process may be performed in order to identify the clogged portion. After that, the washing method as a countermeasure according to a clogged portion determination result is reflected in the water production system that performs an automatic operation. Since the number of operation processes required for the clogged portion identification of the separation membrane module is smaller than that of the related art and the calculation of the operation data is simplified, it is possible to shorten a work time and a data calculation time for a field operator.

In the water production system that performs a continuous operation, in order to analyze data of the washing process (backwashing, air washing, water discharge, and water supply) that is normally performed in a short time with respect to the filtration time and identify the clogged portion of the separation membrane module, it is necessary to set a data collection (also referred to as sampling, acquisition, or recording) cycle to a short time, but since an increase in a storage (recording) amount of the operation data results in a compression of the server capacity, the recording cycle of the data may not be set to be short. Therefore, it is also preferable to further provide a recording cycle setting unit for setting different recording cycles by distinguishing between the operation data of the filtration process and the operation data of the washing process.

The recording cycle of the recording cycle setting unit may be optionally set in units of several tens of seconds to several hours in the filtration process, and is preferably set to 1 minute or more in order to prevent the server capacity from being compressed. However, in the washing process, since the washing time itself is shorter than that in the filtration process and data cannot be acquired in the same recording cycle as that in the filtration process, it is preferable to set the recording cycle in units of several seconds to several tens of seconds, and it is more preferable to set the recording cycle in units of 5 seconds or less for data analysis for identifying the clogged portion of the separation membrane module. In this way, by minimizing the acquisition of operation data in each process as necessary, it is possible to prevent an increase in the server capacity, and in a case of a mode in which the operation data is acquired via the Internet, it is also possible to reduce communications cost.

Further, as the operation data used for identifying the clogged portion, in the case of the filtration process, it is preferable to use data immediately after the start of the filtration process, and for example, it is preferable to use operation data within 5 minutes after the start of the filtration process. In the case of the backwashing process, the resistance (R4) of the separation membrane portion gradually decreases during the backwashing process, and therefore, it is preferable to use operation data in the latter half of the backwashing process or immediately before the end of the backwashing process. For example, when a set time of the backwashing process is 30 seconds, data after an elapse of 15 seconds is preferable, and data after an elapse of seconds is more preferable.

Each of the above-mentioned recording units may be not only a unit that records data of the listed name itself but also a unit that records other information capable of calculating the data of the listed name. For example, the “change rate recording unit” is not only a unit that records the rate of change itself, but a unit that records temporal measurement intervals and an amount of change therebetween may also be used as a change rate recording unit because the rate of change can be calculated based on the temporal measurement intervals and the amount of change therebetween.

Although various embodiments have been described above with reference to the drawings, it is needless to say that the present invention is not limited to such examples. It is apparent to those skilled in the art that various changes and modifications can be conceived within the scope of the claims, and it is also understood that such variations and modifications belong to the technical scope of the present invention. Components in the embodiments described above may be combined freely within a range not departing from the spirit of the invention.

REFERENCE SIGNS LIST

1: water-to-be-treated supply pump
2: water-to-be-treated supply valve
3: separation membrane module
3*a*: lower portion on primary side of separation membrane module
3*b*: upper portion on primary side of separation membrane module
4: backwash drain valve
5: treated water discharge valve
6: treated water storage tank
7: backwash pump
8: backwash valve
9: chemical liquid supply pump
10: chemical liquid storage tank
11: air blower
12: air washing valve
13: drain valve
14: treated water supply valve to primary side
15: water-to-be-treated bypass valve
16: primary side supply pressure sensor
17: primary side outlet pressure sensor (P3)
18: secondary side pressure sensor (P2)
19: water discharge flow rate sensor
20: cylindrical case
21: separation membrane (hollow fiber membrane)
22: potting material
23: cap
24: lower side nozzle
25: upper side nozzle (backwashing wastewater discharge part)
26: upper nozzle (treated water discharge part)
27: lower nozzle (water-to-be-treated supply part)
28: through hole
30: water production system
31: computer
32: clogged portion identifying program
40: operation data recording unit
41: difference calculation unit
42: clogged portion identifying unit
43-*a*: change amount recording unit
43-*b*: change rate recording unit
44-*a*: change amount comparing unit
44-*b*: change rate comparing unit
45: control unit
46: water discharge process calculation unit
47: water discharge process calculation recording unit

The invention claimed is:

1. A method for operating a separation membrane module to identify a clogged portion of the separation membrane module based on a resistance of a lower portion of the separation membrane module, a filtration resistance of a separation membrane portion, and a resistance of an upper portion of the separation membrane module, in a water production system for obtaining treated water by filtering water-to-be-treated with the separation membrane module, wherein the separation membrane module comprises a cylindrical case in which a separation membrane is inserted, and the separation membrane module has: an-a water-to-be-treated supply part supplying the water-to-be-treated in a lower portion on a primary side; a treated water discharge part discharging the treated water in an upper portion on a secondary side; and a backwashing wastewater discharge part discharging backwashing wastewater communicating with an outer side of the separation membrane in an upper portion of a side surface of the cylindrical case on the primary side, and the water production system comprises a supply pressure sensor measuring a pressure (P1) of the water-to-be-treated supply part, a secondary side pressure sensor measuring a pressure (P2) of the treated water discharge part, and a primary side outlet pressure sensor measuring a pressure (P3) of the backwashing wastewater discharge part, the method comprising:

calculating a pressure difference ($\Delta P1$) between the P1 and the P3 in a filtration process of filtering the water-to-be-treated from the primary side to the secondary side of the separation membrane module as a first resistance R1, a pressure difference ($\Delta P2$) between the P3 and the P2 in the filtration process as a second resistance R2, and a pressure difference ($\Delta P3$) between the P1 and the P3 in a backwashing process of pressure-feeding from the secondary side to the primary side of the separation membrane module as a third resistance R3, and identifying the clogged portion of the separation membrane module based on amounts of change or rates of change from respective initial values of the first resistance R1, the second resistance R2, and the third resistance R3 that are obtained by the calculation.

2. The method for operating a separation membrane module according to claim 1, wherein the P3 in the filtration process and the P1 in the backwashing process are static pressures.

3. The method for operating a separation membrane module according to claim 1, wherein amounts of change from the respective initial values of the first resistance R1, the second resistance R2, and the third resistance R3 are compared, and when the amount of change from the initial value of the first resistance R1 is larger than the amount of change from the initial value of the second resistance R2 and the amount of change from the initial value of the third resistance R3, or when the amount of change from the initial value of the first resistance R1 is larger than a set value, at least one of the following controls (A) to (C) is performed:

(A) a control of performing air washing while raising and lowering a liquid surface on the primary side in the separation membrane module;

(B) a control of lengthening a process time of a water discharge process; and (C) a control of pressurizing the primary side of the separation membrane module with air and performing pressurized water discharge for discharging water at the time of the water discharge process.

4. The method for operating a separation membrane module according to claim 1, wherein rates of change from the respective initial values of the first resistance R1, the second resistance R2, and the third resistance R3 are compared, and when the rate of change from the initial value of the first resistance R1 is larger than the rate of change from the initial value of the second resistance R2 and the rate of change from the initial value of the third resistance R3, or when the rate of change from the initial value of the first resistance R1 is larger than a set value, at least one of the following controls (A) to (C) is performed:

(A) a control of performing air washing while raising and lowering a liquid surface on the primary side in the separation membrane module;

(B) a control of lengthening a process time of a water discharge process; and (C) a control of pressurizing the primary side of the separation membrane module with air and performing pressurized water discharge for discharging water at the time of the water discharge process.

5. The method for operating a separation membrane module according to claim 1, wherein amounts of change from the respective initial values of the first resistance R1, the second resistance R2, and the third resistance R3 are compared, and when the amount of change from the initial value of the second resistance R2 is larger than the amount of change from the initial value of the first resistance R1 and the amount of change from the initial value of the third resistance R3, or when the amount of change from the initial value of the second resistance R2 is larger than a set value, at least one of the following controls (F) to (H) is performed:

(F) a control of performing washing of the separation membrane module by supplying a chemical liquid to the separation membrane module;

(G) a control of changing at least one of a backwashing time and an air washing time; and (H) a control of changing at least one of a backwashing flow rate in the backwashing process and an air amount in an air washing process.

6. The method for operating a separation membrane module according to claim 1, wherein rates of change from the respective initial values of the first resistance R1, the second resistance R2, and the third resistance R3 are compared, and when the rate of change from the initial value of the second resistance R2 is larger than the rate of change from the initial value of the first resistance R1 and the rate of change from the initial value of the third resistance R3, or when the rate of change from the initial value of the second resistance R2 is larger than a set value, at least one of the following controls (F) to (H) is performed:

(F) a control of performing washing of the separation membrane module by supplying a chemical liquid to the separation membrane module;

(G) a control of changing at least one of a backwashing time and an air washing time; and (H) a control of changing at least one of a backwashing flow rate in the backwashing process and an air amount in an air washing process.

7. The method for operating a separation membrane module according to claim 1, wherein amounts of change from the respective initial values of the first resistance R1, the second resistance R2, and the third resistance R3 are compared, and when the amount of change from the initial value of the third resistance R3 is larger than the amount of change from the initial value of the first resistance R1 and the amount of change from the initial value of the second resistance R2, or when the amount of change from the initial value of the third resistance R3 is larger than a set value, at least one of the following controls (D) to (E) is performed:

(D) a control of supplying water-to-be-treated in a reverse direction from a nozzle for discharging washing wastewater of the separation membrane module; and (E) a control of performing backwashing, after water on the primary side of the separation membrane module is discharged.

8. The method for operating a separation membrane module according to claim 1, wherein rates of change from the respective initial values of the first resistance R1, the second resistance R2, and the third resistance R3 are compared, and when the rate of change from the initial value of the third resistance R3 is larger than the rate of change from the initial value of the first resistance R1 and the rate of change from the initial value of the second resistance R2, or when the rate of change from the initial value of the third resistance R3 is larger than a set value, at least one of the following controls (D) to (E) is performed:

(D) a control of supplying water-to-be-treated in a reverse direction from a nozzle for discharging washing wastewater of the separation membrane module; and (E) a control of performing backwashing, after water on the primary side of the separation membrane module is discharged.

9. The method for operating a separation membrane module according to claim 1, wherein at least one selected from a primary side pressure fluctuation rate or a water discharge flow rate in the separation membrane module in the water discharge process of discharging water-to-be-treated from a lower portion on the primary side of the separation membrane module to an outside of the system is used as an index, and is combined with the first resistance R1, the second resistance R2, and the third resistance R3 for identifying the clogged portion of the separation membrane module.

10. The method for operating a separation membrane module according to claim 1, wherein a pressure difference (ΔP4) between the P2 and the P1 in the backwashing process is further calculated as a fourth resistance R4, and when a difference (R2−R4) between the second resistance R2 and the fourth resistance R4 is larger than a set value, at least one of the following controls (G) to (I) is performed:

(G) a control of changing at least one of a backwashing time and an air washing time;

(H) a control of changing at least one of a backwashing flow rate in the backwashing process and an air amount in an air washing process; and (I) a control of changing at least one of a water supply process time and a water supply flow rate.

11. The method for operating a separation membrane module according to claim 1, wherein a pressure difference (ΔP4) between the P2 and the P1 in the backwashing process is further calculated as a fourth resistance R4, and when a ratio (R2/R4) between the second resistance R2 and the fourth resistance R4 is larger than a set value, at least one of the following controls (G) to (I) is performed:

(G) a control of changing at least one of a backwashing time and an air washing time;

(H) a control of changing at least one of a backwashing flow rate in the backwashing process and an air amount in an air washing process; and (I) a control of changing at least one of a water supply process time and a water supply flow rate.

12. The method for operating a separation membrane module according to claim 11, wherein a filtration flux in the filtration process and a backwash flux in the backwashing process are the same.

13. The method for operating a separation membrane module according to claim 11 wherein the second resistance R2 and the fourth resistance R4 are resistance values calculated based on the pressure difference, flux data, and water temperature data.

* * * * *